United States Patent [19]
Schmelz et al.

[11] 4,149,173
[45] Apr. 10, 1979

[54] CAPACITOR DIELECTRIC WITH INTERNAL BARRIER LAYERS AND A METHOD FOR ITS PRODUCTION

[75] Inventors: Helmut Schmelz, Prien; Werner Schwaen, Munich, both of Fed. Rep. of Germany

[73] Assignee: Siemens Aktiengesellschaft, Berlin & Munich, Fed. Rep. of Germany

[21] Appl. No.: 858,153

[22] Filed: Dec. 7, 1977

Related U.S. Application Data

[63] Continuation-in-part of Ser. No. 815,579, Dec. 26, 1978, Pat. No. 4,131,903.

[30] Foreign Application Priority Data

Dec. 30, 1976 [DE] Fed. Rep. of Germany ....... 2659672

[51] Int. Cl.$^2$ ............................................. H01L 29/12
[52] U.S. Cl. .......................................... 357/10; 357/61
[58] Field of Search .................................... 357/10, 61

[56] References Cited

U.S. PATENT DOCUMENTS

3,569,802  3/1971  Brauer ................................. 317/238

Primary Examiner—Martin H. Edlow
Attorney, Agent, or Firm—Hill, Gross, Simpson, Van Santen, Steadman, Chiara & Simpson

[57] ABSTRACT

A capacitor dielectric is disclosed with inner blocking layers in which two crystalline main phases are present in about equal portions in order to achieve an improvement in the loss factor of the insulation resistance, the voltage dependency of the dielectric constants and of the insulation resistance, and to achieve tighter manufacturing tolerances.

11 Claims, 5 Drawing Figures

CAPACITOR DIELECTRIC WITH INTERNAL BARRIER LAYERS AND A METHOD FOR ITS PRODUCTION

RELATED APPLICATION

This application is a Continuation-In-Part of our earlier filed copending application Ser. No. 815,579 filed on July 14, 1977, now U.S. Pat. No. 4,131,903 and titled "A Capacitor Dielectric With Inner Blocking Layers and Method For Producing The Same".

BACKGROUND OF THE INVENTION

The invention relates to a capacitor dielectric with internal barrier layers consisting of a polycrystalline ceramic body made of material of perovskite structure on the basis of barium titanate having the general formula $$(Ba_{1-x}M_x^{II})O \cdot z(Ti_{1-y}M_y^{IV})O_2;$$

in which $M^{II}$=Ca, Sr, Pb and/or Mg and $M^{IV}$=Zr and/or Sn and z assumes the values 1.005 to 1.05, and containing at least two different doping substances of which one (in particular antimony, niobium, lanthanum or bismuth) predominantly causes n conduction inside the crystallites and the other (in particular copper, cobalt, nickel, iron or manganese) predominantly causes p conduction in the surface layer of the crystallites, the proportion of the doping substance causing the n conduction being 1.5 to 2.5 times greater than the maximum doping quantity and the proportion of the substance causing the p conduction being 0.01 to 0.15% by weight.

In addition the invention relates to a method for producing such a capacitor dielectric.

Such a capacitor dielectric is described in German Published specification No. 1,614,605, in the corresponding British Pat. No. 1,204,436, and in U.S. Pat. No. 3,569,802.

A capacitor dielectric disclosed in these specifications has been on the market for several years under the name SIBATIT 50.000 (SIBATIT=registered trade mark) and has undergone considerable technical testing. This capacitor dielectric can be used in the form of disks, tubes of circular and of rectangular cross-section, always provided with metal layers (e.g. silver or nickel) as electrodes, and also in the form of so-called "stack capacitors". Stack capacitors are capacitors in which thin layers of dielectric material are disposed one over another alternately with metal layers projecting to the edge on different sides in alternating fashion.

In order to bring about maximum conductivity inside the core with the p doping substance present at the same time despite the proportions of n doping substance which are higher than those normally needed for maximum conductivity (maximum doping), the named specifications propose by way of a preferred production method that all substances be made to react together in oxide form, for in this case the conductivity inside the crystallite cores reaches optimum values while the p doping substance which can only be integrated into the perovskite crystal lattice to a limited degree, if at all, particularly the copper, is essentially incorporated in the surface layer of the crystallites.

When one speaks of values for the dielectric constant (DK) in the case of a capacitor dielectric with internal barrier layers, one is always referring to apparent DK values here, since it is assumed when establishing the DK from measurement of the capacitance of a capacitor of this kind that the entire body has a high $\epsilon$ whereas in fact only the very thin p-n junctions at the grain boundaries become dielectrically effective (barrier layers), exhibiting a normal DK value for barium titanate but giving a DK increased by a multiple because it is related to the entire body.

With a capacitor dielectric, the DK is not alone in playing a part with respect to the level of capacitance for it is also necessary that the dependence of the DK upon an operating temperature, the tangent of the loss angle (loss factor) and the insulation and thus the load capacity of the capacitor fall within certain limits.

This is already largely the case with the capacitor dielectrics with internal barrier layers indicated as being known at the start. However, efforts are being made to improve the electrical properties and to make it even easier to reproduce the electrical values in mass production.

As a criterion for the improvement in the electrical properties of electrical capacitors use is made of the time constant, i.e. the produce of the capacitance of the capacitor and its insulation resistance, indicated in $M\Omega \cdot \mu F$ or, after conversion, indicated in seconds.

The time constant should always be indicated in conjunction with the field strength at which measurement is made, since both the capacitance and the insulating performance depend upon the prevailing field strength.

The known barrier layer capacitors with internal barrier layers have time constants of between 20 and 70 seconds with a field strength of 100 V/mm or between 2 and 20 seconds with a field strength of 200 V/mm.

In the present connection, improvement in the reproducibility of the electrical values in mass production means that the electrical values to be obtained with less deviation when bodies of the same initial composition and having undergone the same preliminary treatment are sintered in different furnaces, for example.

German patent specification No. 909,819, which essentially corresponds to U.S. Pat. No 2,402,515 as far as the present matter is concerned, describes materials of high dielectric constant and methods for their production according to which, among other things, prefabricated titanates and other perovskite materials are pressed into the form of bodies after grinding and mixing and then sintered. Here barium titanate is mixed with strontium or calcium titanate or barium titanate is mixed with strontium stannate.

These known ceramic dielectrics exhibit no internal barrier layers but are homogeneous dielectric materials with high insulating performance and dielectric constants of between 1000 and 9000 in the case of the barium titanate series. The purpose of mixing pre-baked titanates in the above patents is that the dielectric body have an $\epsilon$ value dependent as little as possible upon the temperature between 20° and 150° C., for example. In pure form, barium titanate or other perovskite materials have a relatively low DK which increases dramatically in the area of the Curie temperature and then falls again very sharply above the Curie temperature. The mixing of pre-baked titanates is intended to combine several such peak values together so that the resultant $\epsilon$ temperature curve is flat with relatively high $\epsilon$ values.

Information on the loss factor with the known capacitor dielectrics shows that relatively good values are obtained.

In the case of capacitors with internal barrier layers in which the inside of the crystallite grains is highly conductive, the loss factor is inevitably considerably higher.

The high conductivity inside the grains also produces comparatively poor insulation resistance values.

The reproducibility of the electrical values also poses considerable problems in capacitor dielectrics with internal barrier layers because ultimately the electrical values are greatly dependent on the individual treatment stages.

To get around all these difficulties, with capacitor dielectrics having internal barrier layers the production method up to now (very tight tolerance temperature-time control of the baking process) has been directed so that the crystallites remain as small as possible in the body, i.e. in practice in the range from 20 to 300 $\mu m$, and mixed titanates made together from the oxides have been used as the starting point, and not titanate mixtures.

German Pat. No. 1,490,659, which essentially corresponds to U.S. Pat. No. 3,637,532, describes a sintered electrical cold conductor resistor and a method for its production in which titanates pre-fabricated per se are mixed with one another in order to increase the load quotients, i.e. the ratio of maximum resistance at 200 V/cm to maximum resistance at 10 V/cm — expressed as a percentage.

Admittedly sintered electrical cold conductor resistors of the known kind are also made of barium titanate and substituted barium titanate and are also doped with some considerably different amounts of antimony and copper here, but with these known bodies there is no intention of forming internal barrier layers in such a way that the material can be used as a capacitor dielectric with internal depletion layers. Thus the properties found with sintered electrical cold-conductor resistors cannot be transferred to dielectric bodies with internal barrier layers.

Here in fact the object is to bring the tolerance limits for the electrical values, some of which are relatively broad, closer together, i.e. to make the tolerances for the electrical values arising from production conditions tighter and thus make the desired electrical values in question even easier to reproduce accurately in mass production. Excessively broad limits for the electrical values are obtained in particular when rutile is used as the $TiO_2$ component for the production of the perovskite forming material because then the DK values becomes relatively high (up to 100,000) on the one hand and on the other the scattering of these DK values from capacitor to capacitor within the same baking batch becomes comparatively large with different sintering conditions (e.g. different sintering furnaces). In addition the insulation resistance deteriorates substantially.

SUMMARY OF THE INVENTION

An underlying object of the present invention is to define a capacitor dielectric with internal barrier layers in which the time constant (RC product) and thus the dielectric strength and the continuous load capacity are improved, and to improve the reproducibility of the electrical values, particularly in the case of perovskite material with rutile as the initial substance, and also with anatase used for the $TiO_2$ component.

To achieve this object the capacitor dielectric of the types heretofore indicated is characterized in accordance with the invention in that it consists of two crystalline primary phases of different composition which are present in roughly the same mixture proportions and one of which is a (possibly substituted) barium titanate of the formula $(Ba_{1-x1}M_{x1}^{II})O \cdot z(Ti_{1-y1}M_{y1}^{IV})O_2$ provided with doping substances causing n conduction and p conduction while the other crystalline primary phase is substituted barium titanate of the formula $(Ba_{1-x2}M_{x2}^{II})O \cdot z(Ti_{1-y2}M_{y2}^{IV})O_2$ provided with doping substances causing n conduction and p conduction, in which $x_1$ and/or $y_1$ together with $x_2$ or $y_2$ are also zero.

When $x_1$ and $y_1$ are equal to zero, the first phase is unsubstituted $BaTiO_3$ with doping substances. The other phase must always be substituted differently to the first; this means that $x_2$ and $y_2$ cannot be equal to zero simultaneously or $x_1$ and $x_2$ or $y_1$ and $y_2$ are not the same.

DESCRIPTION OF THE PREFERRED EMBODIMENTS

In the method for producing a capacitor dielectric in accordance with the present invention the initial components needed to make the body are mixed in oxide form or in a form yielding the titanates, are ground up wet or dry, and are then made to produce a solid reaction at 950° C. to 1150° C., after which the reaction product is again ground down to the desired particle size and the powder body is made by pressing or by slip-casting and then sintered at 1250° C. to 1450° C. In accordance with the invention, the two crystalline primary phases are each made to produce a solid reaction independently, after which the reaction products of these solid reactions are gound down to the desired particle size and the dielectric bodies are made by pressing the powder mixed together in the ratio of about 1:1 and then sintering.

Advantageously the capacitor dielectric in accordance with the invention is produced in that the pressed bodies are first heated up to the sintering temperature with a heat-up rate of 200 K/h to 800 K/h at least over the temperature range from 1000° C. to the sintering temperature, then kept at the sintering temperature for one to four hours, thereafter cooled slowly from the sintering temperature down to at least 100 K and about 350 K below the sintering temperature, i.e. at a rate of between 10 K/h to 100 K/h, after which the remaining cooling down to normal temperature is carried out in the cooling conditions peculiar to the sintering furnace.

It can be demonstrated by direct X-ray analysis photography and by the method of determining the distribution of individual elements in a body using a microprobe that two kinds of crystallite grains are present in the capacitor dielectrics in accordance with the invention, each of these kinds being described as a crystalline primary phase in accordance with Gibbs' phase rule. In addition to these two crystalline main phases, the body may also contain further crystalline phases which are present in quantities of a subordinate nature and have practically no effect on the electrical values of the capacitor dielectric, however. Such crystalline secondary phases can develop between the crystallite grains during the sintering process.

The micro-probe analysis method is described in the book by L. S. Birks "Electron Probe Micro Analyses", 1963, Interscience Publishers, and consists in passing a micro-probe over a silver of the body to be tested and determining the amount of a selected element contained in a specific selection of grains, here strontium for example — in the case of the strontium-substituted second crystalline primary phase — or tin in the case of the tin-substituted second primary phase. In the case of the direct X-ray analysis, information about the composition is obtained by measuring the lattice constants and their modification by substitution elements.

The advantage of the capacitor dielectric of the invention when compared with known capacitor dielectrics with internal barrier layers lies in the fact that mixing thoroughly pre-formed initial barrier-layer compounds (conversion at 100°) of differing composition with otherwise identical production conditions gives an end product with grain sizes of between 30 and 90 $\mu$m, while known dielectrics with internal depletion layers have grain sizes ranging from 20 to 300 $\mu$m, the $\epsilon$ values lying between 50,000 and 70,000 depending upon the focal point of the grain spread. The product of capacitance and insulation resistance (RC — known as the time constant) then is equal to about 0.1 seconds, measured with a field strength of 500 V/mm. In contrast, the capacitor dielectrics in accordance with the invention exhibit lower values for the voltage-dependence of the insulation resistance and with a field strength of 500 V/mm a time constant two powers higher (about 10 seconds) is obtained. The $\epsilon$ values are no longer so widely scattered and lie between 50,000 and 60,000. It has been found that the breadth of tolerance or scattering of the DK values from capacitor to capacitor within a production batch is reduced and that the other electrical values as well, such as loss factor, insulation properties and temperature coefficient, fall within closer limits, namely within ranges amounting at most to only half the ranges of variation arising to date for the individual values and the DK values.

The advantages enumerated can be explained by the fact that the grain sizes are smaller and the structure is more uniform because the primary grains of varying composition curtail each other's growth. The grain size spread becomes more even and extraordinarily large grains (larger than 100 $\mu$m) do not occur.

The following information is provided for comparing known capacitor dielectrics having internal barrier layers and for a more detailed explanation of the invention.

The ceramic formulations listed below were produced by converting the oxide mixtures at 1100° C. (solid reaction):

(1) $BaTiO_3 + 0.02TiO_2 + 0.0017Sb_2O_3 + 0.0017CuO$;

0.02 mol of $TiO_2$ is 1.598 gm of $TiO_2$, 0.0017 mol of $Sb_2O_3$ is 0.496 gm of $Sb_2O_3$ and 0.0017 mol of CuO is 0.135 gm of CuO.

These additional amounts relate to 1 mol of $BaTiO_3$. The percentage of $Sb_2O_3$ is thus about 0.21% by weight and the percentage of CuO about 0.058% by weight. In this way it is also possible to translate the data for the following ceramic formulations.

The first ceramic formulation is identified as basic compound a.

(2)
$BaTi_{0.7}Sn_{0.3}O_3 + 0.02TiO_2 + 0.0017Sb_2O_3 + 0.0017CuO$.

This ceramic formulation is identified as basic compound b.

(3) $Ba_{0.9}Sr_{0.1}TiO_3 + 0.0017Sb_2O_3 + 0.0017CuO$.

This ceramic formulation is identified as basic compound c.

(4) Converting the initial components together gives the following ceramic formulation:

$BaTi_{0.85}Sn_{0.15}O_3 + 0.02TiO_2 + 0.0017Sb_2O_3 + 0.0017CuO$.

This compound is identified as comparison compound I.

(5) Converting the initial components together gives the following ceramic formulation:

$Ba_{0.945}Sr_{0.055}Ti_{0.865}Sn_{0.125}O_3 + 0.02TiO_2 + 0.0017Sb_2O_3 + 0.0017CuO$.

This formulation is identified as comparison compound II.

(6) Ceramic formulation consisting of basic compound a and basic compound b in the ratio 1:1 with the overall formula $BaTi_{0.85}Sn_{0.15}O_3 + 0.02TiO_2 + 0.0017Sb_2O_3 + 0.0017CuO$.

This ceramic formulation is identified as mixed component III.

(7) Ceramic formulation consisting of basic compound b and basic compound c in the ratio 0.9:1.1 with the overall formula $Ba_{0.945}Sr_{0.055}Ti_{0.865}Sn_{0.135}O_3 + 0.02TiO_2 + 0.0017Sb_2O_3 + 0.0017CuO$.

This compound is identified as mixed compound IV.

The basic compounds a, b and c and the comparison compounds I and II were made by mixing the initial components needed for production of the bodies in oxide form or a form yielding the oxides (e.g. carbonates) or in a form producing the titanates, grinding them wet or dry, and then making them undergo a solid reaction at temperatures of between 950° C. and 1150° C. (here at 1100° C.). The reaction products were ground down to the desired particle size again.

In the case of comparison compounds I and II the bodies were formed from the ground powder of the solid reaction, e.g. by extrusion, static pressing or by casting, after which these bodies underwent sintering at temperatures of between 1250° C. and 1450° C. (here 1360° C.). The finished sintered bodies were given metallic coatings here as in the other tests, e.g. by painting on silver suspension or nickel in the known manner.

These coatings constitute the electrodes of the capacitor.

The mixed compounds III and IV were made by mixing the reaction products from the solid reaction (conversion reaction for producing the titanates from the oxides) in the ratio of about 1:1, either after grinding of the solid reaction products or before the grinding, so that the mixing process takes place at the same time as the grinding. Otherwise the two reaction products from the solid reaction have to be mixed together intensively again.

Then the ceramic dielectric bodies were produced as described previously from the powder mixtures made in this way from the two basic compounds (either basic compound a and basic compound b or basic compound b and basic compound c) and provided with metal coatings.

1100° C. has proved to be the best temperature for the solid reaction. 20 hours proved to be an adequate grinding time (wet grinding in a ball mill with a volume of 6 liters). Sintering was carried out on both the comparison compounds and the mixed compounds or temperatures between 1350° C. and 1380° C., the most advantageous temperature being 1360° C. to 1370° C.

The following tables permit comparisons to be made between the individual electrical values insofar as these are of interest and were established.

values when use is made of the mixed compounds in accordance with the invention in place of the comparison compounds obtained in the known production process.

The Figures show:

FIG. 1 — Electrical values in relation to the sintering temperature with a conversion temperature of 1100° C. for the solid reaction for comparison compound I.

In this figure, as in FIG. 2 as well, the graphs A, B, C and D always have the same significance — namely:

A — dependence of value on sintering temperature,

B — dependence of insulation resistance on sintering temperature,

C — dependence of loss factor tan δ on sintering temperature,

D — dependence of product R·$C_o$ on sintering temperature. Here $C_o$ is the nominal capacitance at the measured field strength of 1 V/mm.

FIG. 2 shows the same graphs as FIG. 1 but here for mixed compound III.

Comparison of the graphs in FIG. 1 and FIG. 2 shows that considerable improvements are obtained as regards all the electrical values; the lowering of the value and the stability over a sintering temperature range from about 1340° C. to 1380° C. indicate that mixed compounds are less sensitive to the baking conditions.

| | $BaTiO_3$ | $BaTi_{0.7}Sn_{0.3}O_3$ | $Ba_{0.9}Sr_{0.1}TiO_3$ |
|---|---|---|---|
| | | Basic Compounds | |
| | a | b | c |
| ε | 20,000 to 30,000 | 9,000 to 12,000 | 14,000 to 16,000 |
| tan δ at 1 kHz | approx 20 · $10^{-3}$ | approx 40 · $10^{-3}$ | approx 35 · $10^{-3}$ |
| at 100 kHz | approx 20 · $10^{-3}$ | approx 150 · $10^{-3}$ | approx 15 · $10^{-3}$ |
| $ρ_{is}$ at 100 V/mm (Ωcm) | 2 · $10^9$ to $10^{10}$ | 2 · $10^9$ to 6 · $10^9$ | 1 · $10^9$ to 8 · $10^9$ |
| at 200 V/mm (Ωcm) | 3 · $10^8$ to 2 · $10^9$ | 2 · $10^8$ to 1 · $10^9$ | 2 · $10^8$ to 2 · $10^9$ |
| at 500 V/mm (Ωcm) | $10^7$ | $10^7$ | $10^7$ |
| R · $C_o$ at 100 V/mm (sec) | 20 to 80 | 6 to 30 | 10 to 50 |
| at 200 V/mm (sec) | 5 to 20 | 1 to 7 | 2 to 10 |
| at 500 V/mm (sec) | — | — | — |

| | $BaTi_{0.85}Sn_{0.15}O_3$ | $Ba_{0.945}Sr_{0.055}Ti_{0.865}Sn_{0.135}O_3$ |
|---|---|---|
| | Comparison Compounds | |
| | I | II |
| ε | 60,000 to 85,000 | 50,000 to 60,000 |
| tan δ at 1 kHz | approx 35 · $10^{-3}$ | approx 35 · $10^{-3}$ |
| at 100 kHz | approx 70 · $10^{-3}$ | approx 70 · $10^{-3}$ |
| $ρ_{is}$ 100 V/mm (.cm) | 2 · $10^9$ to 2 · $10^{10}$ | 3 · $10^9$ to 3 · $10^{10}$ |
| at 200 V/mm (.cm) | 4 ·$10^8$ to 4 ·$10^9$ | 6 · $10^8$ to 5 · $10^9$ |
| at 500 V/mm (.cm) | <$10^7$ | <$10^7$ |
| R · $C_o$ at 100 V/mm (sec) | 60 to 180 | 50 to 150 |
| at 200 V/mm (sec) | 10 to 80 | 2 to 70 |
| at 500 V/mm (sec) | 0.1 to 5 | 0.1 to 4 |

| | a + b (1:1) | b + c (0.9:1.1) |
|---|---|---|
| | Mixed Compounds | |
| | III | IV |
| ε | 50,000 to 60,000 | 48,000 to 57,000 |
| tan δ at 1 kHz | approx 35 · $10^{-3}$ | approx 35 · $10^{-3}$ |
| at 100 kHz | approx 70 · $10^{-3}$ | approx 70 · $10^{-3}$ |
| $ρ_{is}$ at 100 V/mm (Ωcm) | 4 · $10^{10}$ to $10^{11}$ | 5 · $10^{10}$ to $10^{11}$ |
| at 200 V/mm (Ωcm) | 3 · $10^{10}$ to 9 · $10^{10}$ | 4 · $10^{10}$ to 9 · $10^{10}$ |
| at 500 V/mm (Ωcm) | 5 · $10^9$ to 3 · $10^{10}$ | 7 · $10^9$ to 3 · $10^{10}$ |
| R · $C_o$ at 100 V/mm (sec) | 100 to 500 | 100 to 400 |
| at 200 V/mm (sec) | 80 to 300 | 80 to 270 |
| at 500 V/mm (sec) | 10 to 150 | 10 to 100 |

Figure 1A:
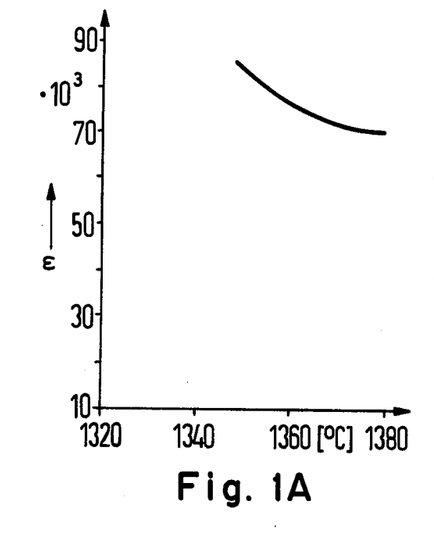
FIG. 1 is a series of four graphs illustrating the variation of electrical parameters with respect to sintering temperature for a comparison compound I.
Figure 1B:
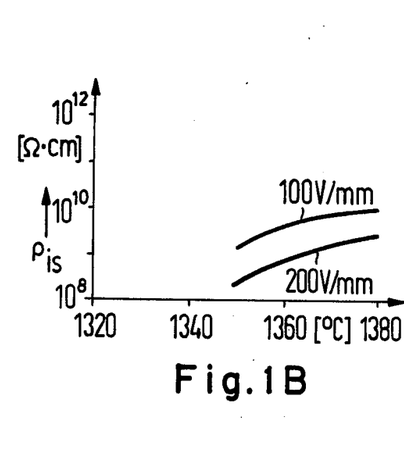
Figure 1C:
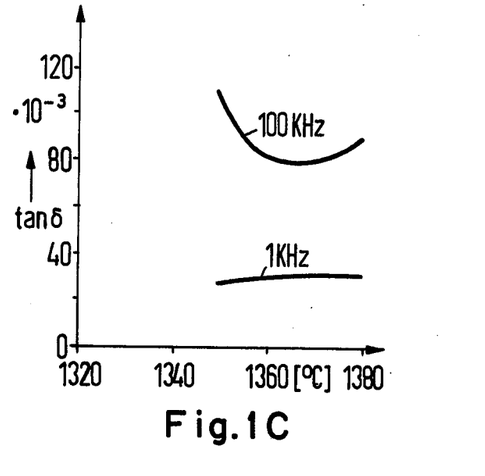
Figure 1D:
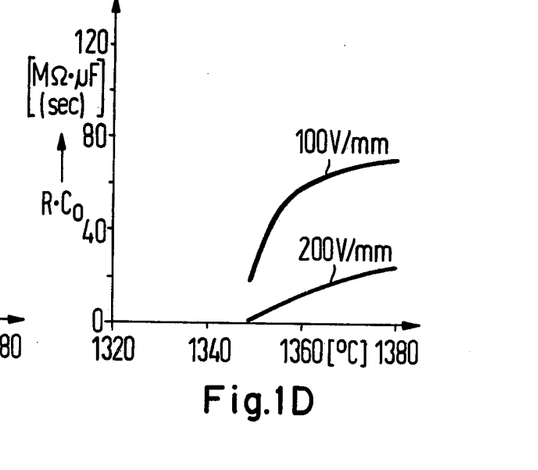
Figure 2A:
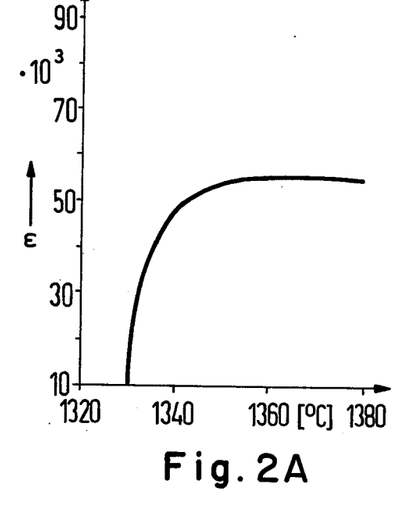
FIG. 2 is a series of four graphs illustrating the same parameters of FIG. 1 only for a mixed compound III.
Figure 2B:
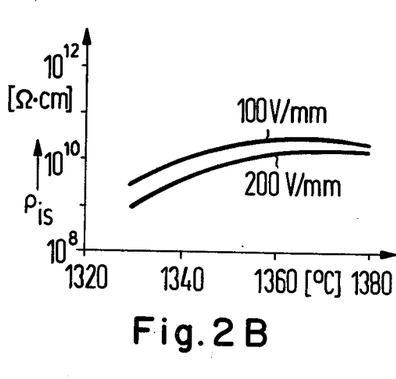
Figure 2C:
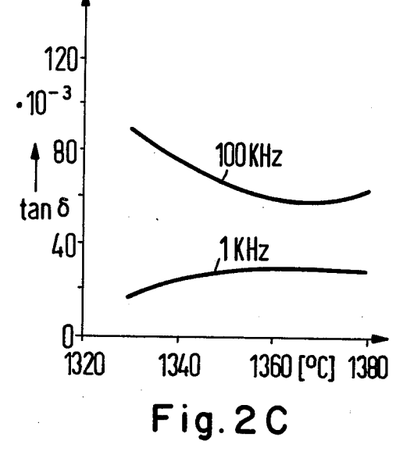
Figure 2D:
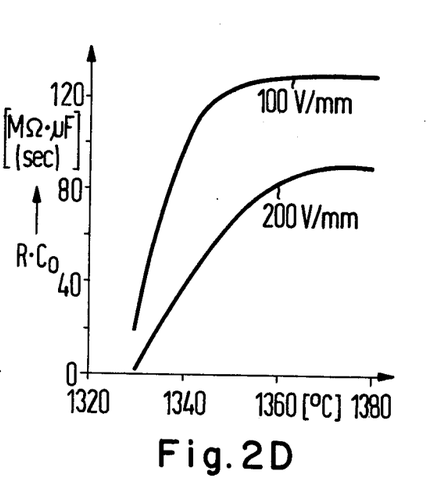
Figure 3:
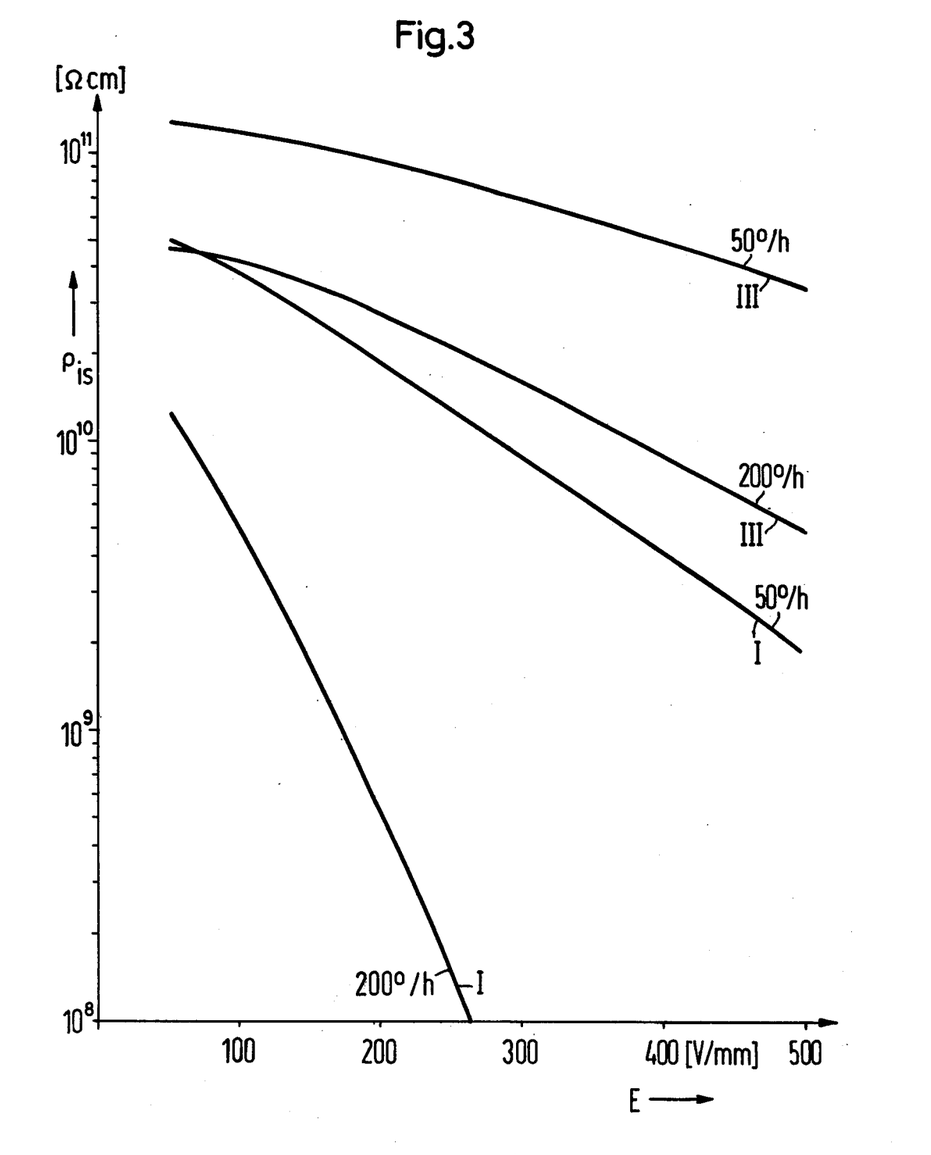
FIG. 3 is a graph illustrating the dependence of insulation resistance on fields of strength for the comparison compound I and the mixed compound III.

Both the tables and the attached graphs show that improvements occur in practically all the electrical In FIG. 3, which shows a graph for the dependence of the insulation resistance on the field strength, curves are plotted for different cooling conditions. Comparison of mixed compound III at a cooling rate of 50° C./h and 200° C./h with the corresponding curves for comparison compound I shows that improvements have been made here which, for example, with the usual rapid cooling at 200° C./h are a further indication of how little the capacitor dielectric body in accordance with the invention is dependent on the baking conditions relative to the compared compound.

Figure 4:
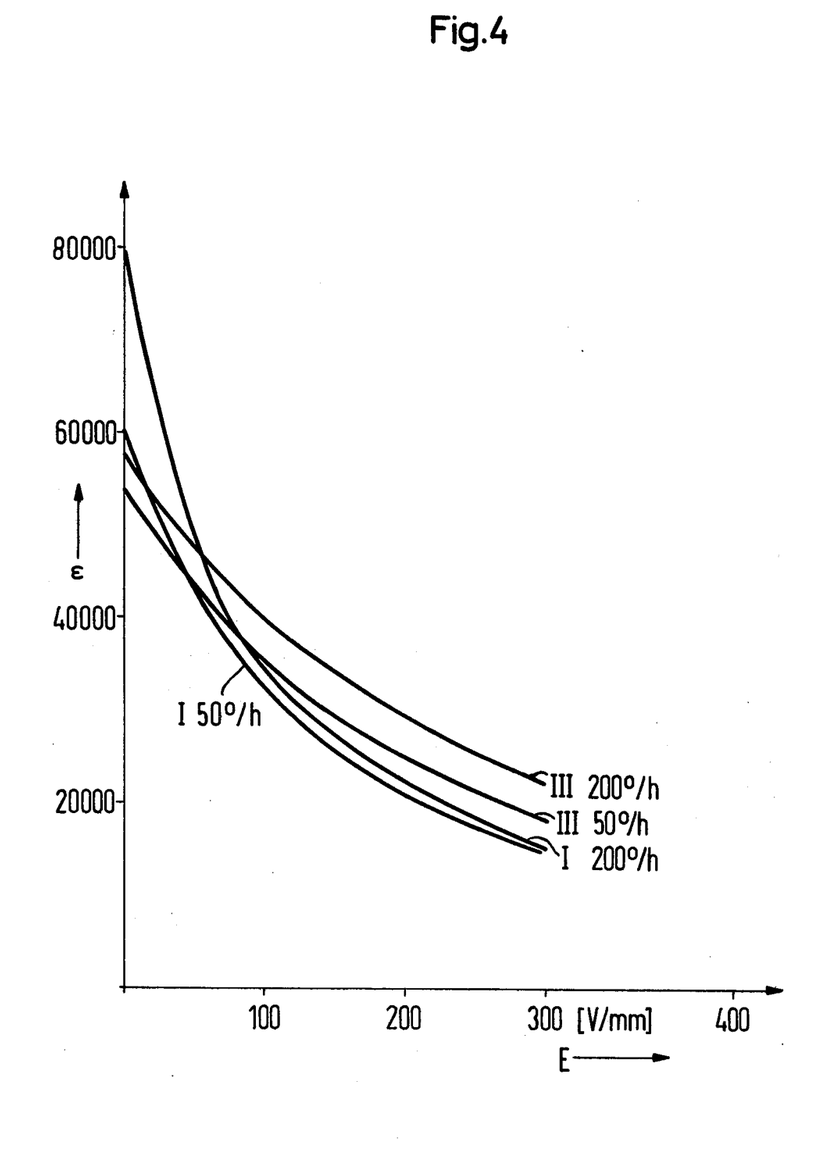
FIG. 4 is a graph illustrating the dependence of the value on field strength for the comparison compound I and the mixed compound III.

FIG. 4 shows the dependence of the ε value on the field strength being applied, and here again the mixed compound III shows improved values with varying cooling conditions.

Figure 5:
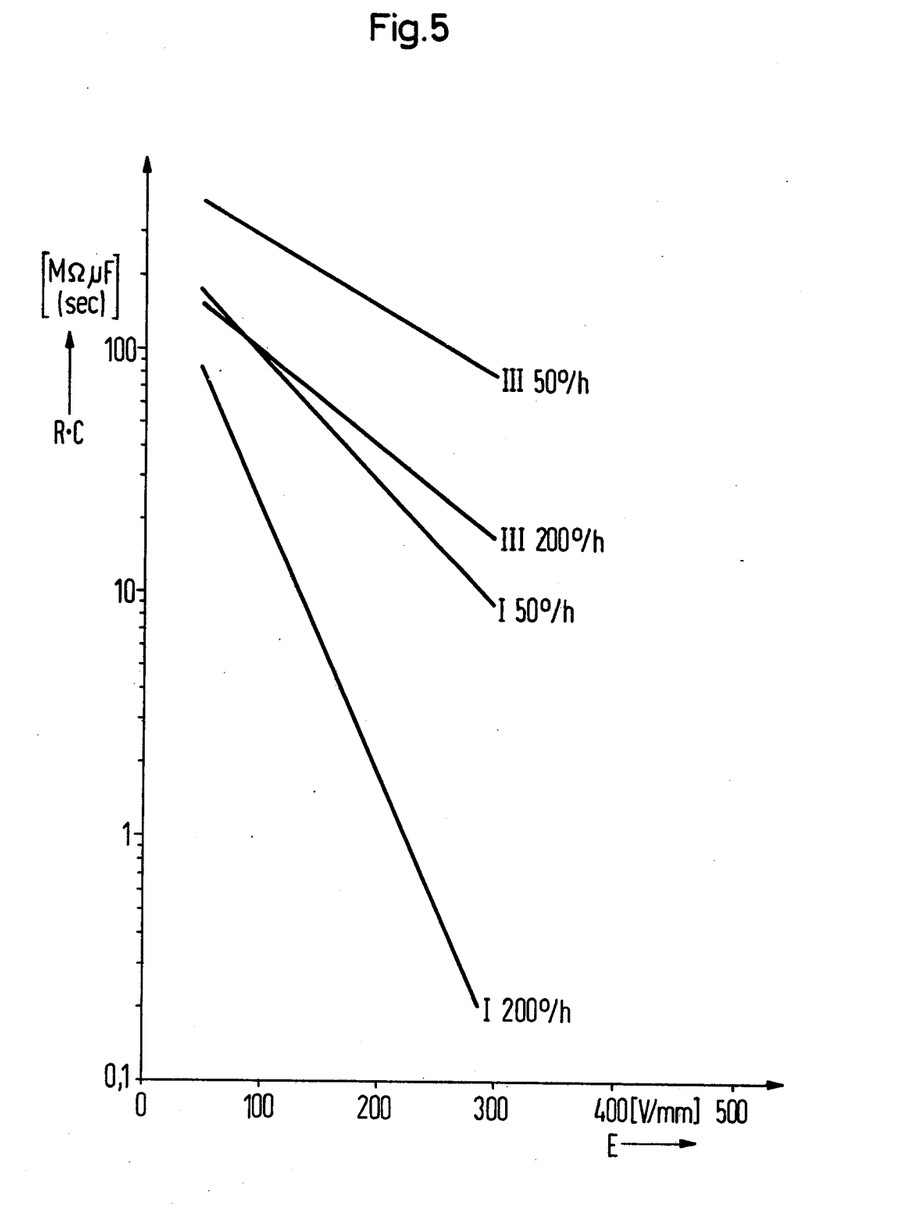
FIG. 5 is a graph illustrating the dependence of the RC product upon field strength for the comparison compound I and the mixed compound III.

FIG. 5 shows the dependence of the R·C product upon the field strength E in V/mm, but here, in contrast to graphs D in FIGS. 1 and 2, the capacitance values are now measured at the respective superimposed direct voltages.

It can be seen from FIGS. 3 to 5 that improvements can always be obtained with careful cooling. The tests made when trying out the invention show that mixed compounds are distinctly superior to the ceramic compounds made in the usual way for capacitor dielectrics with internal depletion layers. The following can be regarded as essential advantages of mixed compounds:

I. Higher R·C product through more homogeneous crystal structure;

II. Reduced dependence on voltage for
   (a) the insulation resistance,
   (b) the capacitance as a result of smaller mean grain size;

III. Reduced dependence on frequency for
   (a) the loss factor,
   (b) the capacitance through the grain volume having higher conductivity.

The sum of these individual factors is particularly noticeable when the rules for the production of high-quality ceramic dielectrics with internal depletion layers are observed. In addition to the precise chemical composition, the homogeneity of the compound should be ensured at every stage of production. The production parameters, such as grinding conditions, slip viscosity of the grinding fluid, conversion temperature and sintering control (heating at specific rate, period of maintenance at sintering temperature, cooling conditions) should therefore be adhered to as precisely as possible.

These basic rules had to be followed up to now in the production of capacitor dielectrics with internal barrier layers. The formulations made by mixing basic compounds make no difference to these rules, but the latitude in processing (insensitivity to incomplete observation of the rules) and reproducibility are improved, and the electrical properties — as shown — are considerably better.

Through the reduced dependence of the resistance of the mixed compounds upon voltage one obtains R·C values powers higher with lower values for the loss factor.

Overall, therefore, the result is a reduction in the scrap rate during production together with a simultaneous gain in the service reliability of these capacitors.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A capacitor dielectric with internal barrier layers comprising: a polycrystalline ceramic body made of material of a perovskite structure on the basis of barium titanate of the general formula $(Ba_{1-x}M_x^{II})O \cdot z(Ti_{1-y}M_y^{IV})O_2$ in which $M^{II}$ is selected from the group consisting of Ca, Sr, Pb and Mg and $M^{IV}$ is selected from the group consisting of Zr and Sn and z assumes the values 1.005 to 1.05; at least two different doping substances one of which causing predominantly n conduction inside the crystallites and the other causing predominantly p conduction in a surface layer of the crystallites; a proportion of the doping substance causing the n conduction being 1.5 to 2.5 times greater than the maximum doping quantity and a proportion of the substance causing the p conduction amounting to 0.01 to 0.15% by weight; the capacitor dielectric comprising two crystalline main phases of different composition which are present in roughly the same quantities and of which the first is substituted barium titanate of the formula $(Ba_{1-x1}M_{x1}^{II})O \cdot z(Ti_{1-y1}M_{y1}^{IV})O_2$ provided with doping substances causing n conduction and p conduction and the second crystalline main phase is substituted barium titanate of the formula $(Ba_{1-x2}M_{x2}^{II})O \cdot z(Ti_{1-y2}M_{y2}^{IV})O_2$ provided with doping substances causing n conduction and p conduction $x_1$, $y_1$, $x_2$, and $y_2$ assuming a value between 0 and 1.

2. The dielectric of claim 1 in which the doping substance causing predominantly n conduction is selected from the group consisting of antimony, niobium, lanthanum and bismuth and the doping substance causing predominantly p conduction is selected from the group consisting of copper, cobalt, nickel, iron, and manganese.

3. The dielectric of claim 1 in which $x_1$ and $x_2$ are zero.

4. The dielectric claim 3 in which $y_1$ is also zero.

5. The dielectric of claim 1 in which $y_1$ and $y_2$ are zero.

6. The dielectric of claim 5 in which $x_1$ is also zero.

7. A capacitor dielectric as in claim 1 characterized in that the second crystalline main phase comprises barium titanate of the formula $BaO \cdot z(Ti_{0.7}Sn_{0.3})O_3 (z=1.025)$ doped with 0.18 to 0.28% by weight of $Sb_2O_3$ and 0.03 to 0.07% by weight of CuO.

8. A capacitor dielectric as in claim 1 characterized in that the second crystalline main phase comprises barium titanate of the formula $(Ba_{0.9}Sr_{0.1}) \cdot zTiO_2 (z=1.012$ to $1.025)$ doped with 0.18 to 0.28% by weight of $Sb_2O_3$ and 0.03 to 0.07% by weight of CuO.

9. A capacitor dielectric as in claim 7, characterized in that $Sb_2O_3$ is at least partially replaced with corresponding amounts of a compound selected from the group consisting of $Nb_2O_5$, $La_2O_3$ and $Bi_2O_3$.

10. The dielectric of claim 1 in which $x_1$ and $y_2$ are zero.

11. The dielectric of claim 1 in which $y_1$ and $x_2$ are zero.

* * * * *